United States Patent
Jung (10) Patent No.: US 7,356,439 B2
(45) Date of Patent: Apr. 8, 2008

(54) MOTION DETECTION APPARATUS AND METHOD

(75) Inventor: You-young Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 436 days.

(21) Appl. No.: 10/695,169

(22) Filed: Oct. 29, 2003

(65) Prior Publication Data

US 2004/0101053 A1    May 27, 2004

(30) Foreign Application Priority Data

Nov. 27, 2002    (KR) .................. 10-2002-0074277

(51) Int. Cl.
*G01C 17/00* (2006.01)
*H04N 7/01* (2006.01)

(52) U.S. Cl. ..................... 702/150; 348/452

(58) Field of Classification Search ............... 702/150, 702/35, 36, 176; 348/607, 618, 619, 620, 348/621, 622, 623, 699, 700, 701, 668, 669, 348/451, 452; 382/254, 260, 266, 267, 268; 356/452; 375/452
See application file for complete search history.

(56) References Cited

U.S. PATENT DOCUMENTS

| | | | | |
|---|---|---|---|---|
| 4,731,651 A | * | 3/1988 | Matsumoto et al. | 348/443 |
| 5,111,511 A | * | 5/1992 | Ishii et al. | 382/107 |
| 5,153,719 A | | 10/1992 | Ibenthal | |
| 5,398,071 A | | 3/1995 | Gove et al. | |
| 5,400,083 A | * | 3/1995 | Mizusawa | 348/620 |
| 5,568,196 A | * | 10/1996 | Hamada et al. | 348/416.1 |
| 5,796,437 A | | 8/1998 | Muraji et al. | |
| 5,844,630 A | | 12/1998 | Yamauchi | |
| 5,982,444 A | | 11/1999 | Kato et al. | |
| 5,995,154 A | | 11/1999 | Heimburger et al. | |

(Continued)

FOREIGN PATENT DOCUMENTS

EP    0 883 298 A2    12/1998

(Continued)

OTHER PUBLICATIONS

U.S. Appl. No. 10/428,210, filed May 15, 2003, Seung-joon Yang et al., Samsung Electronics Co., Ltd.

(Continued)

*Primary Examiner*—John Barlow
*Assistant Examiner*—Victor J. Taylor
(74) *Attorney, Agent, or Firm*—Staas & Halsey LLP (57) ABSTRACT

An image motion detection apparatus and method detecting a motion in a moving image by sequentially being input with a plurality of fields that are temporally successive and detecting motion information values representing presence and absence of motion for each pixel/block of an input nth field. A motion calculation buffer stores the motion information values for each pixel/block; and a motion calculation unit corrects the motion information values of the input nth field stored in the motion calculation buffer unit, based on the motion information values of the n+1th field. Thus, it is possible to quickly and correctly detect motion regions and still regions in a moving image by a relatively simple method of correcting the motion information values while suppressing a spurious still region occurrence in a currently interpolated field.

14 Claims, 4 Drawing Sheets

U.S. PATENT DOCUMENTS

| | | | |
|---|---|---|---|
| 6,014,182 A | 1/2000 | Swartz | |
| 6,058,140 A | 5/2000 | Smolenski | |
| 6,061,100 A * | 5/2000 | Ward et al. | 348/607 |
| 6,108,041 A | 8/2000 | Faroudja et al. | |
| 6,201,577 B1 | 3/2001 | Swartz | |
| 6,297,848 B1 | 10/2001 | Westerman | |
| 6,370,198 B1 | 4/2002 | Washino | |
| 6,559,890 B1 | 5/2003 | Holland et al. | |
| 6,580,463 B2 | 6/2003 | Swartz | |
| 6,700,622 B2 | 3/2004 | Adams et al. | |
| 6,731,342 B2 * | 5/2004 | Shin et al. | 348/452 |
| 6,757,022 B2 | 6/2004 | Wredenhagen et al. | |
| 6,891,571 B2 | 5/2005 | Shin et al. | |
| 6,937,655 B2 | 8/2005 | De Haan et al. | |
| 6,989,845 B1 * | 1/2006 | Okamoto et al. | 345/691 |
| 2002/0149703 A1 | 10/2002 | Adams et al. | |
| 2003/0189667 A1 | 10/2003 | Chow | |
| 2004/0101053 A1* | 5/2004 | Jung | 375/240.16 |

FOREIGN PATENT DOCUMENTS

| | | | |
|---|---|---|---|
| EP | 1 091 580 | | 4/2001 |
| EP | 1 168 842 | | 1/2002 |
| EP | 1 198 137 | A1 | 4/2002 |
| EP | 1 198 139 | | 4/2002 |
| EP | 1 100 267 | | 5/2004 |
| GB | 2 258 580 | | 2/1993 |
| JP | 03-280681 | | 12/1991 |
| JP | 04-137892 | | 5/1992 |
| JP | 07-288780 | | 10/1995 |
| JP | 2000-138908 | | 5/2000 |
| JP | 2000-278622 | | 10/2000 |
| JP | 2001-024963 | | 1/2001 |
| JP | 2001-028720 | | 1/2001 |
| JP | 2001-028735 | | 1/2001 |
| JP | 2001-337595 | | 12/2001 |
| JP | 2002-016944 | | 1/2002 |
| JP | 2002-57993 | | 2/2002 |
| KR | 2001-2659 | | 1/2001 |
| KR | 2001-90568 | | 10/2001 |
| WO | WO 95/24100 | | 9/1995 |
| WO | 00/16561 | | 3/2000 |
| WO | WO 02/56597 | | 7/2002 |

OTHER PUBLICATIONS

U.S. Appl. No. 10/704,663, filed Nov. 12, 2003, Jong-hwan Lee et al., Samsung Electronics Co., Ltd.
European Search Report for European Office Application No. 03024897.5.
European Search Report for European Office Application No. 03026725.6.
Chinese Office Action for Application No. 200310116599.7.
German Office Action for German Application No. 10331048.7.
Japanese Office Action for Japanese Application No. 2003-423610.
Translation of JP 2002-016944 (Detailed Description part).
U.S. Appl. No. 10/704,663, filed Nov. 12, 2003, Lee et al., Samsung Electronics Co., Ltd.
U.S. Appl. No. 10/714,605, filed Nov. 18, 2003, Jung et al., Samsung Electronics Co., Ltd.
U.S. Appl. No. 10/438,210, filed May 15, 2003, Yang et al., Samsung Electronics Co., Ltd.
U.S. Appl. No. 10/714,605, filed Nov. 18, 2003, You-Young Jung, Samsung Electronics Co., Ltd.

* cited by examiner

MOTION DETECTION APPARATUS AND METHOD

CROSS-REFERENCE TO RELATED APPLICATIONS

This application claims the benefit of Korean Application No. 2002-74277, filed Nov. 27, 2002, in the Korean Intellectual Property Office, the disclosure of which is incorporated herein by reference.

BACKGROUND OF THE INVENTION

1. Field of the Invention

The present invention generally relates to a motion detection apparatus and method, and more particularly to a motion detection apparatus and method capable of detecting motion regions having motion and still regions having no motion.

2. Description of the Related Art

There is a known interlaced scan method and a progressive scan method as scan methods in image display apparatuses. The interlaced scan method is used for general television (TV), and refers to the method in which when displaying one image, the image is displayed on screen by dividing the image frame into two fields and alternately transmitting one of them and then the other. On the other hand, the progressive scan method is used for a computer monitor, digital television and the like, and refers to the method in which the full frames are displayed in one frame unit at a time as a moving picture (e.g., a film) is projected on the screen.

With increasing necessity of data exchange between apparatuses using different scan methods, because of the increasing image display apparatuses using the progressive scan method, various interpolation methods are needed for converting the interlaced scan method into the progressive scan method.

As general interpolation methods, there is an intra-field interpolation method forming a new field by inserting a given data into the region between two lines of the current field, the given data being obtained by dividing the data of the two lines by 2, and an inter-field interpolation method without the compensation for motion by forming one frame, using the lines corresponding to the fields immediately before and after the current field, between the lines of the current field.

The intra-field interpolation method is suited for interpolating the motion region having motion, and the inter-field interpolation method is suited for interpolating the still region having no motion. However, since it is common to have the motion regions and the still regions in the scene, it is effective to interchangeably use the intra-field interpolation method and the inter-field interpolation method for improving the image quality after the interpolation. In this case, by calculating a proper mixing factor ($\alpha$) based on information detecting the motion region and the still region in the scene and using the mixing factor, it is possible to interchangeably use the intra-field interpolation method and the inter-field interpolation method.

Thus, to obtain the improved image quality by the intra-field and inter-field interpolations, it is primarily required to correctly detect the motion region and the still region in the field to be presently interpolated. To this end, based upon the previous field and the next field immediately before and after the current field to be interpolated, a method is generally used for detecting the motion region and the still region in the field to be presently interpolated by using the difference of the luminance values between pixels at corresponding locations.

However, according to the above-described detection method, due to a very quick motion in the scene, there often occurs a problem that the process may not correctly detect the motion region and the still region only by the luminous value comparing with the preceding field and the succeeding field. As a consequence, a spurious still region may occur, the spurious still region referring to a region that is substantially the motion region, but is erroneously detected as the still region. Therefore, to improve the image quality after the interpolation, a method is needed for correctly detecting the motion region without the spurious still region occurrence.

As the prior art related to such a method, there is a method for detecting the motion region using pixel values and a brightness profiles pattern difference (BPPD) disclosed in Korean Patent Laid-open No. 2001-2659. Also, Korean Patent Laid-open No. 2001-90568 discloses another method in which the motion region is detected using the motion metric by combination of the prescribed pixel luminance values.

However, according to the above-described disclosed methods, the circuit implementation for detecting the motion region is somewhat complex, and it is expected that the processing speed is accordingly not high due to the complexity of the circuit. Thus, a new apparatus and method is needed for quickly detecting the motion region and the still region with easy implementation (i.e., by detecting the motion region with a more simple construction than the existing methods).

SUMMARY OF THE INVENTION

Therefore, the present invention provides an apparatus and method for easily and quickly detecting motion regions and still regions of a moving picture without the occurrences of spurious still regions in the current field to be interpolated.

Additional aspects and advantages of the invention will be set forth in part in the description which follows and, in part, will be obvious from the description, or may be learned by practice of the invention.

The present invention may be achieved by a motion detection apparatus detecting a motion region, comprising a motion detection unit sequentially being input with a plurality of fields that are temporally successive and detecting motion information values representing presence and absence of a motion for each pixel/block of an nth field that is input at present; a motion calculation buffer unit storing the motion information values for each pixel/block; and a motion calculation unit correcting the motion information values stored in the motion calculation buffer unit, based on the motion information values of an n+1th field input to the motion detection unit.

According to an aspect of the present invention, a motion expansion unit expands an extent of a pixel motion from the pixel with the motion to a neighboring other pixel, based on the motion information values stored in the motion calculation buffer unit.

According to an aspect of the present invention, the motion detection unit may calculate the motion information values based upon a previous field and a next field immediately before and after the input nth field, respectively, and depending on a difference of pixel values between pixels/blocks at corresponding locations in the previous field and the next field.

According to an aspect of the present invention, based on the motion information values for each pixel/block of the n+1th field, the motion calculation unit may correct the motion information values by adding a given first value to a corresponding motion information value stored in the motion calculation buffer unit if a corresponding pixel/block has motion, and subtracting a given second value from a corresponding motion information value stored in the motion calculation buffer unit if a corresponding pixel/block has no motion.

According to an aspect of the present invention, the given first value is greater than the given second value.

According to an aspect of the present invention, the motion calculation unit may comprise an adder adding a given first value to the corresponding motion information value and outputting the added value; a subtracter subtracting a given second value from the corresponding motion information value and outputting the subtracted value; a first and second limiters correcting the values output from the adder and the subtracter so as not to be out of a certain range (i.e., so that the motion information values output from the adder and the subtracter are within a certain range) and outputting respective corrected values of the limiters; a multiplexer selectively outputting either of the values output from the first and the second limiters depending on the motion information value of the n+1th field.

The present invention may be also achieved by a method of detecting motion by sequentially inputting a plurality of fields that are temporally successive; detecting motion information values representing presence and absence of a motion for each pixel/block of an input nth field; storing the motion information values for each pixel/block; and correcting the stored motion information values, based on the motion information value of an input n+1th field.

According to an aspect of the present invention, the method further comprises expanding an extent of a pixel motion detected based upon the motion information values from the pixel with the motion to a neighboring other pixel, based on the stored motion information values.

According to an aspect of the present invention, the motion information values are detected based upon a previous field and a next field immediately before and after the input nth field and depending on a difference of pixel values between pixels/blocks at corresponding locations in the previous field and the next field.

According to an aspect of the present invention, based on the motion information values for each pixel/block of the n+1th field, the motion information values may be corrected by adding a given first value to a corresponding stored motion information value if a corresponding pixel/block has motion, and subtracting a given second value from a corresponding stored motion information value if a corresponding pixel/block has no motion.

According to an aspect of the present invention, the given first value is greater than the given second value.

According to an aspect of the present invention, the correcting of the motion information values comprises adding a given first value to the corresponding motion information value and outputting the added value; subtracting a given second value from the corresponding motion information value and outputting the subtracted value; correcting/limiting the motion information values output from the adding and subtracting so as not to be out of a certain range (i.e., so that the motion information values output from the adding and the subtracting are within a range) and outputting corrected values of the adding and the subtracting, respectively; selectively outputting either of the motion information values output from the adding and the subtracting, and as limited, depending on the motion information values of the input n+1th field.

BRIEF DESCRIPTION OF THE DRAWINGS

The above and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the present embodiments of the present invention, examples of which are illustrated in the accompanying drawings, wherein like reference numerals refer to the like elements throughout. The embodiments are described below to explain the present invention by referring to the figures.

Figure 1:
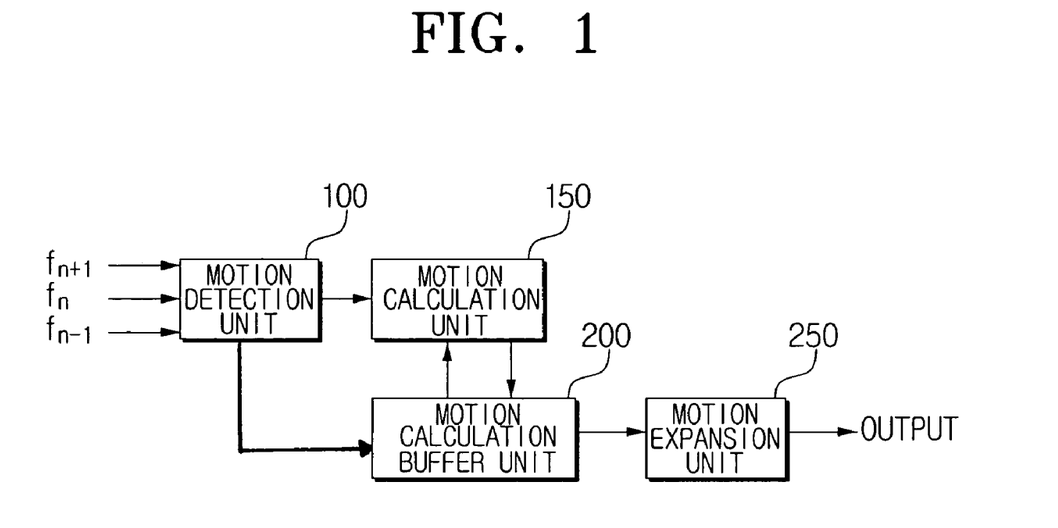
FIG. 1 is a functional block diagram of a motion detection apparatus in accordance with an embodiment of the present invention.

FIG. 1 is a functional block diagram of a motion detection apparatus in accordance with an embodiment of the present invention. The motion detection apparatus comprises a motion detection unit 100, a motion calculation unit 150, a motion calculation buffer unit 200, and a motion expansion unit 250. The motion detection unit 100 is sequentially input with a plurality of image fields that are temporally successive. The motion detection unit 100 detects motion information values representing presence and absence of a motion for each pixel/block of an input nth field and stores the motion information values in the motion calculation buffer unit 200. Here, the pixel/block is an image pixel or an image block. The motion detection unit 100 may detect the motion on a pixel by pixel basis or on a block by block basis depending on the subject/image processing environment.

The motion calculation unit 150 corrects the motion information values for each pixel/block stored in the motion calculation buffer unit 200, based on the motion information value detected by the motion detection unit 100, and the motion calculation unit 150 stores the corrected motion information values for each pixel/block at locations that are set for each pixel/block in the motion calculation buffer unit 200. The motion expansion unit 250 expands an extent of a pixel motion detected based upon a motion information value from the pixel having the motion to a neighboring other pixel, based on the motion information values stored in the motion calculation buffer unit 200.

Figure 2:
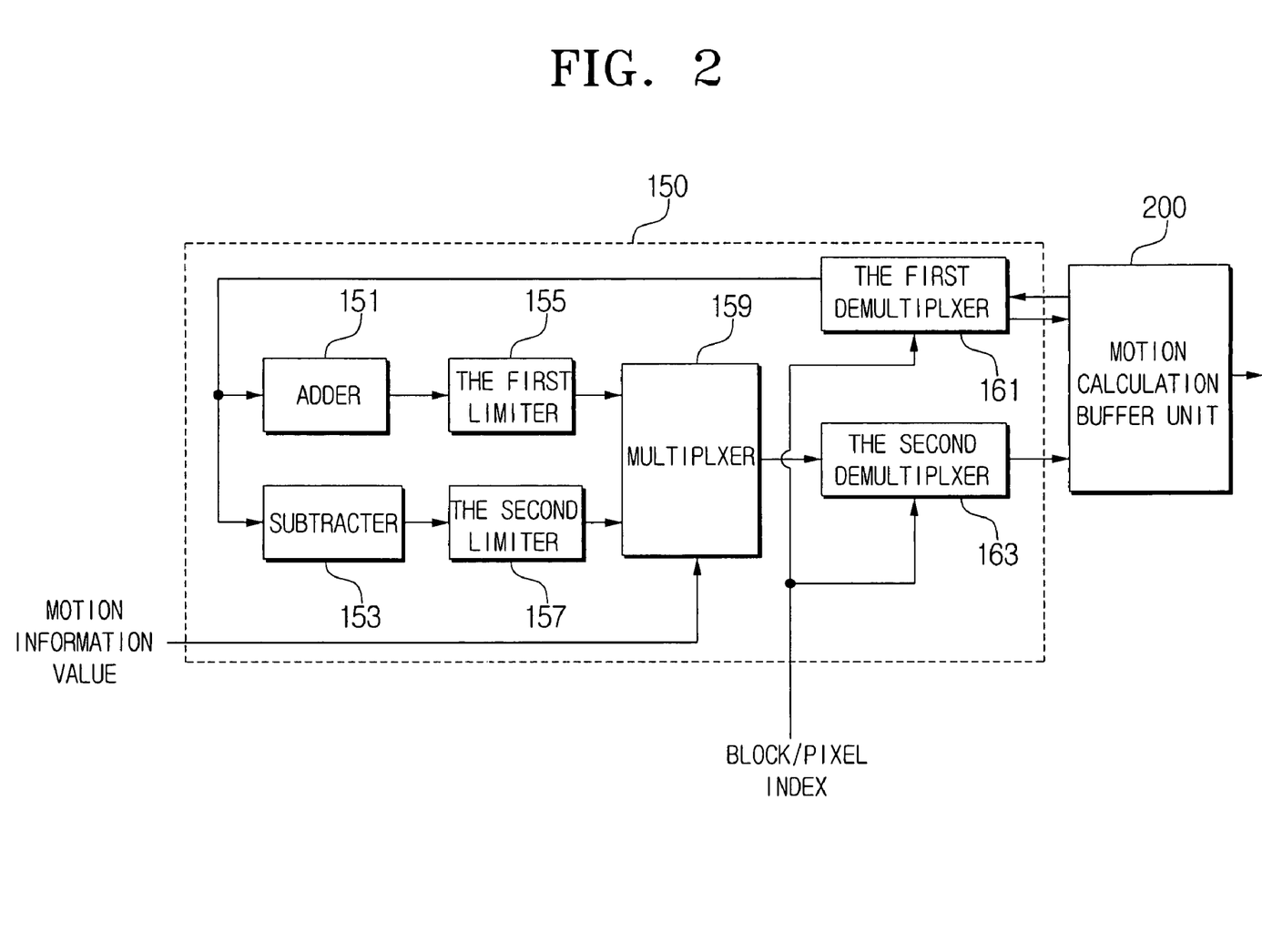
FIG. 2 is a detailed functional block diagram of a motion calculation unit shown in FIG. 1.

FIG. 2 is a detailed functional block diagram of the motion calculation unit 150 shown in FIG. 1. The motion calculation unit 150 comprises an adder 151, a subtracter 153, first and second limiters 155 and 157, a multiplexer 159, and first and second demultiplexers 161 and 163. The first demultiplexer 161 provides the adder 151 and the subtracter 153 with the motion information values for each pixel/block stored at the respective corresponding location in the motion calculation buffer unit 200, typically, based on externally input block/pixel index information.

The adder 151 adds a given first value to an incoming motion information value, and the subtracter 153 subtracts a given second value from an incoming motion information value. The first and second limiters 155 and 157 limit the magnitudes of the motion information values from the adder 151 and the subtracter 153 so as not to exceed a certain range, respectively (i.e., so that the motion information values output from the adder and the subtracter are within a certain range). The multiplexer 159 outputs either of the values from the first and second limiters 157 and 159 to the second demultiplexer 163 depending on motion information values of a subsequent input n+1th field from the motion detection unit 100. The second demultiplexer 163 stores the value from the multiplexer 159 at the corresponding location set in the motion calculation buffer unit 200.

Figure 3:
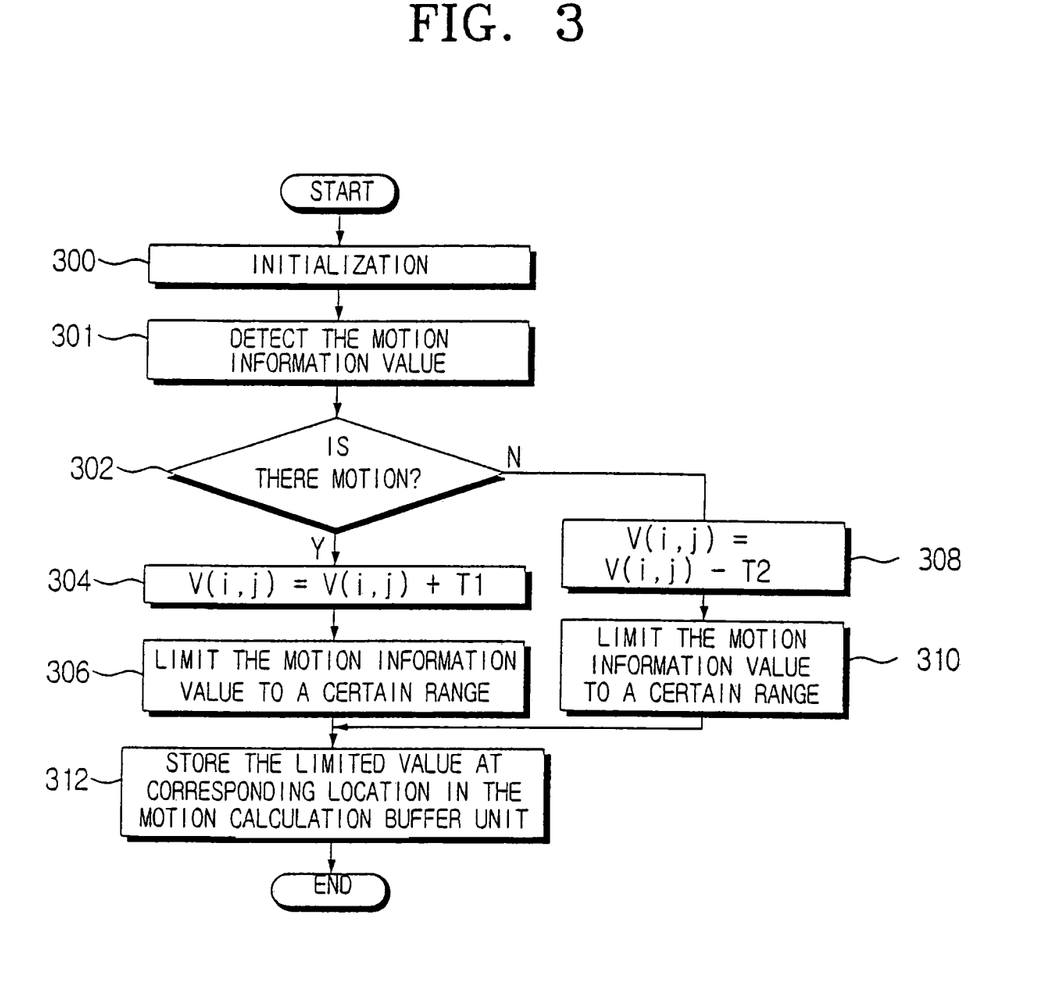
FIG. 3 is a flow chart of detecting motion in an input motion picture using the motion detection apparatus shown in FIG. 1, in accordance with an embodiment of the present invention.

FIG. 3 is a flow chart of detecting motion in an input motion picture using the motion detection apparatus shown in FIG. 1 in accordance with an embodiment of the present invention. Referring to FIG. 3, at operation 300, initializing processing is performed. In other words, the motion detection unit 100 is sequentially input with a plurality of fields that are temporally successive, and assuming an incoming field to be an nth field ($f_n$), based upon an n−1th field ($f_{n-1}$) and an n+1th field ($f_{n+1}$) immediately before and after the incoming field ($f_n$), at operation 301, the motion detection unit 100 detects motion information values representing presence or absence of motion for each pixel/block of the nth field ($f_n$). Typically, at operation 301, it is possible to detect the motion information value for each pixel/block, on the basis of the preceding field and the succeeding field immediately before and after the nth field ($f_n$), from difference values for the pixels between pixels/blocks at a corresponding location in the preceding field and the succeeding field, or a summed value of absolute values of a difference between the pixel values for each block. The motion information value is expressed as a certain value indicating the presence or absence of the motion in a corresponding pixel/block, for example, as a '1' in a case where the motion is present in the corresponding pixel/block, or as a '0' in a case where the motion is absent in the corresponding pixel/block.

At operation 301, the motion information value for each pixel/block of the nth field ($f_n$) calculated by the motion detection unit 100 is stored in the motion calculation buffer unit 200 by each pixel/block unit and the initialization processing ends. After completing the calculation processing on the motion information value for the nth field ($f_n$), at operation 301, the motion detection unit 100 repeatedly performs the above procedures by assuming the n+1th field ($f_{n+1}$), which is the next field, to be the current field, and detects the motion information value representing the presence or absence of motion for each pixel/block of the n+1th field.

At operation 302, the motion calculation unit 150 is supplied with the motion information values for each pixel/block detected by the motion detection unit 100 for a transmitted nth field ($f_n$). At operation 302, the motion calculation unit 150 determines if there is motion in the pixel/block of interest of the transmitted nth field ($f_n$) based on the information values for each pixel/block of the transmitted n+1th field ($f_{n+1}$). If, at operation 302, the motion calculation unit 150 determines that there is motion in the pixel/block of interest, at operation 304, the motion calculating unit 150 fetches the motion information value of the pixel/block of interest from a location corresponding to the nth field stored in the motion calculation buffer unit 200 in the initializing processing, and adds a given first value (T1) to the fetched motion information value to calculate a new motion information value as follows:

$$V(i, j) = V(i, j) + T1 \quad \text{(Formula 1)}$$

In Formula (1), V (i, j) represents the fetched motion information value for jth pixel on line ith, and T1 represents the first value set. The first value may be set at random/arbitrary and may be set, for example, to the number '4'.

Otherwise, if, at operation 302, the motion calculation unit 150 determines that there is no motion in the pixel/block of interest, at operation 308, the motion calculating unit 150 fetches the motion information value of the pixel/block of interest from a location corresponding to the nth field stored in the motion calculation buffer unit 200 in the initializing processing, and subtracts a given second value (T2) from the fetched motion information value to calculate a new motion information value as follows:

$$V(i, j) = V(i, j) - T2 \quad \text{(Formula 2)}$$

In Formula (2), V (i, j) represents the motion information value for jth pixel on line ith, and T2 represents the second value set. Similar to the first value, the second value may be set at random/arbitrary and may be set, for example, to the number '1'. According to an aspect of the invention, typically, T1 and T2 are random numbers within a predetermined range according to image processing application. Typically, the first demultiplexer 161 in the motion calculation unit 150 performs operation 302. Further, the adding operation 304 or the subtracting operation 308 is performed by the adder 151 or the subtracter 153, respectively, in the motion calculation unit 150.

At operation 306, the first and second limiters 155 and 157 determine that the added or subtracted motion information value falls in a certain range, and in a case where the added or subtracted motion information value is above or below a set value, the first and second limiters 155 and 157 correct the added or subtracted motion information value so as not to be out range of the set value.

At operation 312, the motion calculation unit 150 stores the limited added or subtracted motion information value at the corresponding location set in the motion calculation buffer unit 200. Operations 300 through 312, as shown in FIG. 3, are repeatedly performed on a field by field basis for a plurality of fields that are sequentially input to the motion detection unit 100, and hence the motion information value accumulated with addition or subtraction is stored in the motion calculation buffer unit 200. The number of accumulated motion information value may properly be set depending on the subject/image processing environment.

Thus, by referring to the accumulated motion information value in the buffer 200, it is possible to remove spurious still regions that may occur in case of detecting the motion by using only the preceding field and the succeeding field immediately before and after the current field, or spurious motion regions that may occur in the converse case, because of the limited added to or the limited subtracted from motion information values (i.e., adjusted motion information values) of the nth field ($f_n$) using the n+1th field ($f_{n+1}$). More particularly, the present invention provides a machine readable storage storing at least one program controlling a moving image processor according to a process of removing spurious still regions and spurious motion regions during an image field motion detection based upon a limited added to or a limited subtracted from pixel motion information values of a current image field using only immediately preceding and succeeding image fields to the current image field.

According to an aspect of the present invention, the motion detecting apparatus further comprises a motion expansion unit 250. In this case, the motion expansion unit 250 expands an extent of a pixel motion detected from a motion information value from the pixel with the motion to a neighboring other pixel, based on the motion information value stored in the motion calculation buffer unit 200. The reason why the motion expansion unit 250 expands the extent of the motion from the pixel with the motion to the neighboring other pixel is generally that the motion in a moving image is not present at only a specific pixel, but the motion is present at some regions. Accordingly, if a motion in a specific pixel is sensed, it can be likely that the specific pixel and its surrounding pixels are subjected to move.

Figure 4:
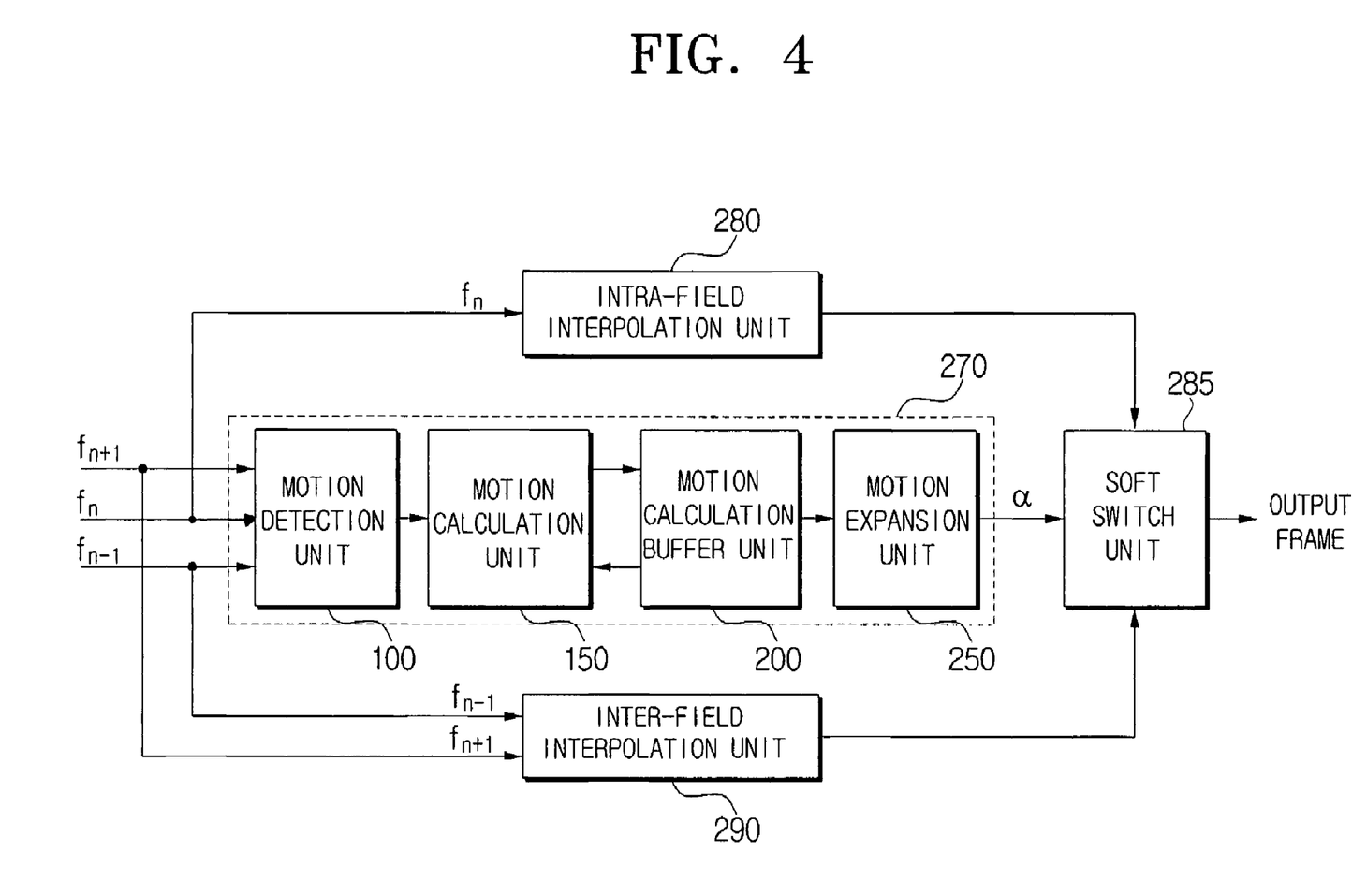
FIG. 4 is functional block diagram of an example deinterlacing device using the motion detection apparatus shown in FIG. 1, in accordance with an embodiment of the present invention.

FIG. 4 is functional block diagram of an example deinterlacing device using the motion detection apparatus shown in FIG. 1, in accordance with an embodiment of the present invention. A motion detection apparatus according to the present invention may be used with a deinterlacing apparatus to convert an interlaced scan format to a progressive scan format video signal. In FIG. 4, the deinterlacing device incorporates a motion detection apparatus 270, which calculates a mixed value ($\alpha$) based upon motion information values detected and corrected according to operations 300 through 312 as shown in FIG. 3. With the calculated mixed value ($\alpha$), a soft switch unit 285 mixes an output of an intra-field interpolation unit 280 using the intra-field interpolation method and an output of an inter-field interpolation unit 290 using the inter-field interpolation method, thereby generating a resulting output image frame.

As described above, in accordance with the present invention, it is possible to quickly and correctly detect motion regions and still regions by a relatively simple method while suppressing the occurrence of a spurious still region in a currently interpolated field. The detect motion information on such a motion region and a still region is provided to a screen interpolation device and the like and is used therein. The processes of the present invention as embodied in the functional block units of FIGS. 1, 2 and 4 and as shown in FIG. 3, are implemented in software and/or computing hardware. More particularly, the present invention provides an image motion detection apparatus and method comprising a motion detection unit detecting a motion in a moving image (picture) by sequentially being input with a plurality of image fields that are temporally successive and detecting motion information values representing presence and absence of motion for each pixel/block of an input nth field. A motion calculation buffer stores the motion information values for each pixel/block; and a motion calculation unit corrects the motion information values of the input nth field stored in the motion calculation buffer unit, based on the motion information values of the n+1th field. Thus, it is possible to quickly and correctly detect motion regions and still regions in a moving image by a relatively simple method of correcting the motion information values while suppressing a spurious still region occurrence in a currently interpolated field.

Although technical spirits of the present invention has been disclosed with reference to the appended drawings and the example embodiments of the present invention corresponding to the drawings has been described, descriptions in the present specification are only for illustrative purpose, not for limiting the present invention. Also, those who are skilled in the art will appreciate that various modifications, additions and substitutions are possible without departing from the scope and spirit of the present invention. Therefore, it should be understood that the present invention is limited only to the accompanying claims and the equivalents thereof, and includes the aforementioned modifications, additions and substitutions.

What is claimed is:

1. A motion detection apparatus, comprising:
   a motion detection unit sequentially being input with a plurality of fields that are temporally successive and detecting motion information values representing presence and absence of a motion for each pixel/block of an input nth field;
   a motion calculation buffer storing the motion information values for each pixel/block; and
   a motion calculator correcting the motion information values of the input nth field stored in the motion calculation buffer unit, based on the motion information values of an input n+1th field detected by the motion detection unit, by adding a given first value to a motion information value stored in the motion calculation buffer unit if a corresponding pixel/block has motion, and subtracting a given second value from a motion information value stored in the motion calculation buffer unit if a corresponding pixel/block has no motion.

2. The motion detection apparatus of claim 1, further comprising a motion expansion unit expanding an extent of a pixel motion detected based upon a motion information value from the pixel with the motion to a neighboring pixel.

3. The motion detection apparatus of claim 1, wherein the motion detection unit calculates each motion information value based upon a previous field and a next field immediately before and after the nth field, respectively, and depending on a difference of the pixel values between pixels/blocks at corresponding locations in the previous field and the next field.

4. The motion detection apparatus of claim 1, wherein the given first value is greater than the given second value.

5. The motion detection apparatus of claim 1, wherein the motion calculation unit comprises:
   an adder adding the given first value to the motion information value and outputting an added value;
   a subtracter subtracting the given second value from the motion information value and outputting a subtracted value;
   first and second limiters correcting the motion information values output from the adder and the subtracter to be within a certain range and outputting respective corrected motion information values of the limiters; and
   a multiplexer selectively outputting either of the motion information values output from the first and the second limiters depending on a motion information value of the input n+1th field.

6. A motion detection method, comprising:
   sequentially inputting a plurality of fields that are temporally successive;
   detecting motion information values representing presence and absence of a motion for each pixel/block of an input nth field;
   storing the motion information values for each pixel/block;
   correcting the motion information values of the input nth field stored in the motion calculation buffer unit, based on the motion information values of an input n+1th field, by adding a given first value to a stored motion information value if a corresponding pixel/block has motion, and subtracting a given second value from a stored motion information value if the corresponding pixel/block has no motion; and storing the corrected motion information.

7. The motion detection method of claim 6, further comprising expanding an extent of a pixel motion detected from a motion information value from the pixel with the motion to a neighboring pixel.

8. The motion detection method of claim 6, wherein the detecting of the motion information values comprises calculating the motion information values based upon a previous field and a next field immediately before and after the input nth field, respectively, and depending on a difference of the pixel values between pixels/blocks at corresponding location in the previous field and the next field.

9. The motion detection method of claim 6, wherein the given first value is greater than the given second value.

10. The motion detection method of claim 6, wherein the correcting of the motion information values further comprises:
 adding the given first value to the motion information value and outputting the added value;
 subtracting the given second value from the motion information value and outputting the subtracted value;
 limiting the motion information values output from the adding and the subtracting to be within a certain range and outputting the corrected values of the adding and the subtracting; and
 selectively outputting either of the motion information values output from the limiting depending on a motion information value of the input n+1th field.

11. A moving image processor, comprising:
 a motion detector detecting motion information values representing presence and absence of a motion for each pixel/block of an input nth image field;
 a motion calculator adjusting according to a formulaic value the detected motion information values of the input nth image field based upon motion information values of an input n+1th image field and calculating a mixed value ($\alpha$) according to the adjusted detected motion information values of the input nth image field; and
 a deinterlacing processor outputting an image frame based upon the mixed value.

12. The processor of claim 11, wherein the deinterlacing processor mixes intra-field and inter-field interpolation outputs and the adjusted detected motion information values to output the image frame.

13. The processor of claim 11, wherein the motion information values are adjusted according to a formula $V(i,j)=V(i,j)+T1$ or a formula $V(i,j)=V(i,j)-T2$, and wherein the $V(i,j)$ represents a motion information value for jth pixel on line ith of the input nth image field, and T1 and T2 are random first and second values within a predetermined range, respectively.

14. At least one medium comprising computer readable code to control at least one processing element in a computer to implement a method for controlling a moving image processor, the method comprising:
 removing spurious still regions and spurious motion regions during an image field motion detection, based upon a limited added to or a limited subtracted from, pixel motion information values of a current image field using only immediately preceding and succeeding image fields to the current image field.

* * * * *

UNITED STATES PATENT AND TRADEMARK OFFICE
CERTIFICATE OF CORRECTION

PATENT NO.         : 7,356,439 B2                                    Page 1 of 1
APPLICATION NO. : 10/695169
DATED              : April 8, 2008
INVENTOR(S)        : You-Young Jung

It is certified that error appears in the above-identified patent and that said Letters Patent is hereby corrected as shown below:

Title Page, Column 2 (U.S. Patent Documents), Line 2, after "Heimburger" delete "et al.".

Title Page, Column 2 (Other Publications), Line 1, change "10/428,210," to --10/438,210,--.

Signed and Sealed this

Twenty-sixth Day of August, 2008

JON W. DUDAS
*Director of the United States Patent and Trademark Office*